(No Model.) 2 Sheets—Sheet 1.
C. REUTHER.
GRAIN WEIGHING APPARATUS.

No. 478,465. Patented July 5, 1892.

Witnesses:
H. G. Dietrich
B. W. Sommers

Inventor:
Carl Reuther (No Model.)　　　　　　　　　　　　　　　　　　2 Sheets—Sheet 2.
C. REUTHER.
GRAIN WEIGHING APPARATUS.

No. 478,465.　　　　　　　　　　　　　Patented July 5, 1892.

Witnesses:　　　　　　　　　　　　　　　　　　Inventor:
H. G. Dieterich　　　　　　　　　　　　　　　Carl Reuther.
B. W. Sommers.　　　　　　　　　　　　　　By
　　　　　　　　　　　　　　　　　　　　　　　　Atty.

UNITED STATES PATENT OFFICE.

CARL REUTHER, OF HENNEF-ON-THE-SIEG, GERMANY.

GRAIN-WEIGHING APPARATUS.

SPECIFICATION forming part of Letters Patent No. 478,465, dated July 5, 1892.

Application filed December 17, 1891. Serial No. 415,440. (No model.) Patented in Germany June 26, 1891, No. 59,962.

*To all whom it may concern:*

Be it known that I, CARL REUTHER, a subject of the German Emperor, residing at Hennef-on-the-Sieg, in the German Empire, have invented certain new and useful Improvements in Automatic Weighing Apparatus, (patented in Germany by Letters Patent No. 59,962, dated June 26, 1891,) of which the following is a specification.

My invention relates to improvements in that class of weighing apparatus in which the receptacle for receiving the material to be weighed empties itself automatically each time a given weight corresponding with that the scale-beam is constantly charged with, as shown and described in Letters Patent granted to M. E. Reisert, dated, respectively, January 17, 1888, No. 376,679; January 24, 1888, No. 376,965, and October 29, 1889, No. 414,080; and the object of my invention is to provide means for determining while the weights on the seat remain unaffected the weight of such remaining portions of the material to be weighed which do not perform a full charge. I attain this object by the mechanism illustrated in the accompanying drawings, in which—

Figure 1:
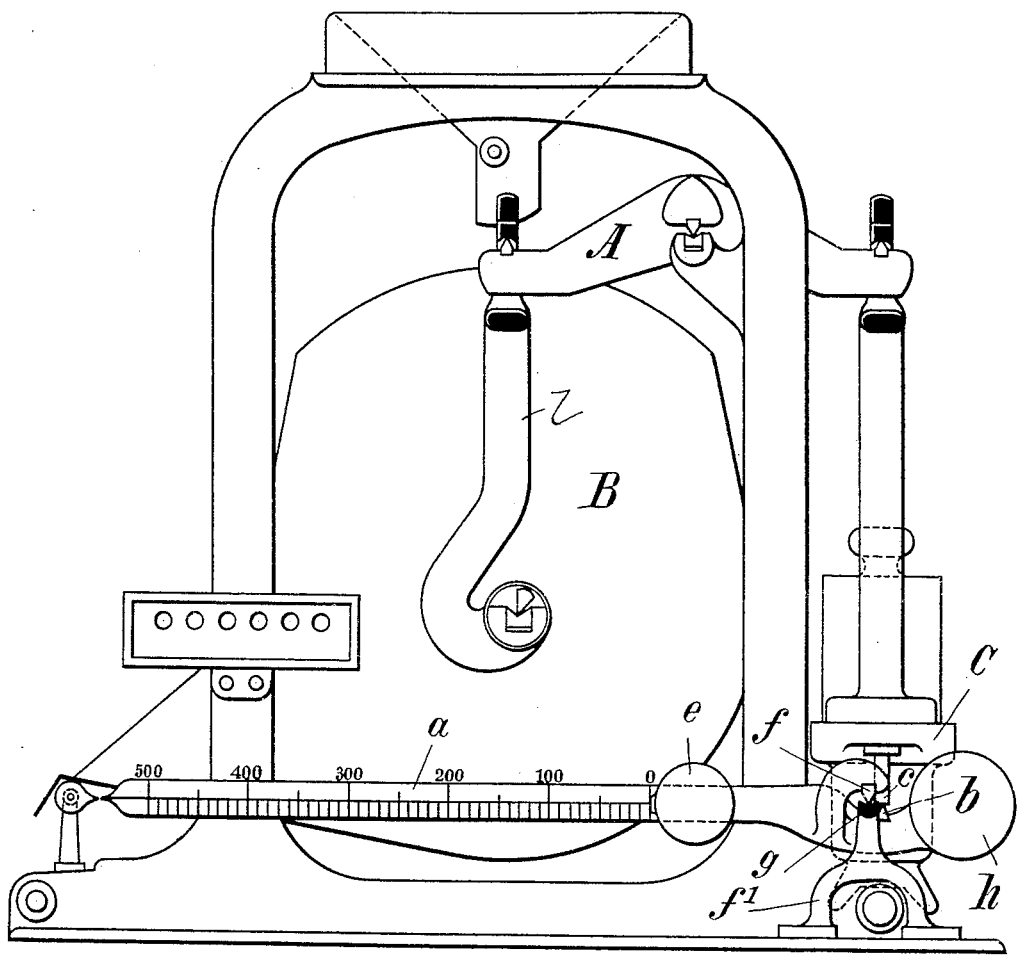
Figure 2:
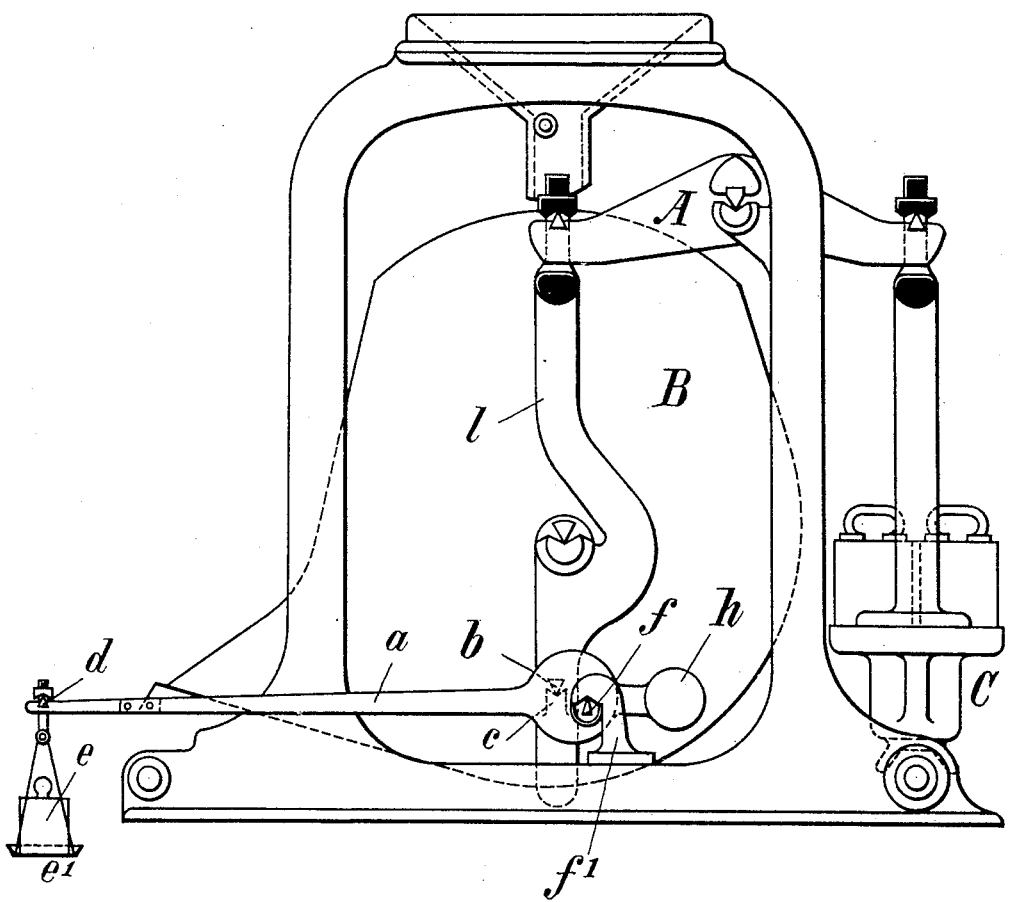

Figure 1 is a side elevation of an automatic weighing apparatus embodying my invention, the former being represented in outline as the specific mechanism for effecting the automatic emptying of the receptacle and the recording of the same are not at all touched by the application of my invention, which rather forms an attachment of any weighing apparatus of the class referred to; and Fig. 2, a side view of the same apparatus, showing a modification of the mechanism forming the subject-matter of my invention.

Similar letters refer to similar parts throughout the several views.

A is the scale-beam, B the receptacle for receiving the material to be weighed, and C the seat for the weight of an automatic weighing apparatus of known construction. On the frame of such apparatus I am accustomed to mount a standard $f'$, which is provided at its top with a hardened surface or pan $g$ for the knife-edge $f$ of a separate scale-beam $a$ to rest on, Fig. 1. An upward-pointing knife-edge $b$ of this scale-beam is designed to bear against the downward-projecting pan $c$, connected to the weight-seat C of the automatic weighing apparatus under the influence of a sliding weight $e$ on the scale-beam. The latter is further provided with a counter-weight $h$, which serves to balance the load of a seat $e'$, Fig. 2, or that of the weight $e$ in its position on the zero-mark of the scale-beam $a$. If, therefore, after the weighing of a larger quantity of material—such as grain—a portion is received within the receptacle B of the automatic weighing apparatus which does not amount to a full charge corresponding with the weight on the seat C, it is only necessary to shift the sliding weight $e$ on the auxiliary scale-beam $a$ or by otherwise loading the same until the latter, as well as the main scale-beam, equipoises. Thus the difference of the weight on the seat C and that required for equipoising the scale-beam $a$ gives exactly the weight of the remaining material in the receptacle B to be determined by means of my invention. This will be easily understood by way of an example. Assuming the automatic weighing apparatus being charged according to a discharge of five hundred pounds at every time the main scale-beam A equipoises, while the supply stops, the seat C is to be loaded with weights amounting, also, to five hundred pounds. If, however, the weight of a remaining portion, forming only a part of five hundred pounds, is to be determined and there are two hundred and fifty-four pounds required to accomplish the equilibrium of the weighing apparatus in case of a leverage of one to one hundred of the scale-beam $a$, or the sliding weight $e$ on the latter to be shifted until it points upon two hundred and fifty-four pounds on the lever-scale, the actual weight of the remaining material within the receptacle B is five hundred less two hundred and fifty-four, or equal to two hundred and forty-six pounds.

In Fig. 2 is illustrated a modification of the herein-described mechanism, inasmuch as the auxiliary scale-beam $a$ is attached to the receptacle B of the automatic weighing apparatus through the medium of the suspension-rod $l$, upon the lateral projecting pan $c$ of which rests the knife-edge $b$ of the scale-beam $a$, the knife-edge $f$ of the same pointing in this case upwardly and the standard $f'$ being correspondingly altered. Although a sliding weight may also be employed with the scale-beam $a$, as in the former case, I have attached to the latter a seat $e'$ for the reception of variable weights $e$, which is suspended by the knife-edge $d$ at the end of the scale-beam. Notwithstanding this modified arrangement of the auxiliary scale, the mode of determining the weight of remaining portions of the material to be weighed and run into the receptacle B will be the same, as above described.

During the operation of the automatic weighing apparatus with full charges it is desirable to set the auxiliary balance at rest, either by removing it entirely or by arresting the weighted arm of the scale-beam $a$ in such a raised position that the pans $c$ of the up-and-down-moving receptacles B or seat C may not interfere with the knife-edges $b$ of the scale-beam $a$.

Having fully described my invention, what I claim, and desire to secure by Letters Patent, is—

1. In an automatic weighing apparatus of the class described, means for determining the weight of a fraction of a load in the receiving-vessel without varying the load on the scale-beam, which consist in the combination, with the main scale-beam A and vessel B, of an auxiliary scale-beam $a$ and a weight or weights adapted to be connected therewith, said auxiliary scale-beam operating to counterbalance both the load on the main scale-beam and the load in vessel B, as set forth.

2. In an automatic weighing apparatus of the class described, means for determining the weight of a fraction of a load in the receiving-vessel without varying the load on the scale-beam, which consist in the combination, with the main scale-beam A and vessel B, of an auxiliary scale-beam $a$, adapted to be influenced by the load in said vessel and to influence the load on the main scale-beam by acting directly upon such load, and a weight or weights for connection with the auxiliary scale-beam to counterbalance both the load on the main scale-beam and the load in the receiving-vessel, as set forth.

In testimony that I claim the foregoing as my invention I have signed my name, in presence of two witnesses, this 19th day of November, 1891.

CARL REUTHER.

Witnesses
H. A. MAXWELL,
BILLA LANG.